US009144064B2

(12) United States Patent
Chang et al.

(10) Patent No.: US 9,144,064 B2
(45) Date of Patent: *Sep. 22, 2015

(54) GENERATING DOWNLINK FRAME AND SEARCHING FOR CELL

(71) Applicant: Electronics and Telecommunications Research Institute, Daejeon (KR)

(72) Inventors: Kap Seok Chang, Daejeon (KR); Il Gyu Kim, Chungcheongbuk-do (KR); Hyeong Geun Park, Daejeon (KR); Young Jo Ko, Daejeon (KR); Hyo Seok Yi, Daejeon (KR); Chan Bok Jeong, Daejeon (KR); Young Hoon Kim, Daejeon (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 319 days.

This patent is subject to a terminal disclaimer.

(21) Appl. No.: 13/657,409

(22) Filed: Oct. 22, 2012

(65) Prior Publication Data

US 2013/0100902 A1    Apr. 25, 2013

Related U.S. Application Data

(63) Continuation of application No. 12/488,272, filed on Jun. 19, 2009, now Pat. No. 8,320,571, which is a continuation of application No. PCT/KR2008/004223, filed on Jul. 18, 2008.

(30) Foreign Application Priority Data

Jul. 20, 2007 (KR) .......................... 10-2007-0072837
Aug. 21, 2007 (KR) .......................... 10-2007-0083915
May 8, 2008 (KR) .......................... 10-2008-0042907
Jul. 1, 2008 (KR) .......................... 10-2008-0063388

(51) Int. Cl.
*H04W 72/04* (2009.01)
*H04B 7/26* (2006.01)
(Continued)

(52) U.S. Cl.
CPC ........... *H04W 72/042* (2013.01); *H04B 7/2656* (2013.01); *H04J 11/0069* (2013.01);
(Continued)

(58) Field of Classification Search
CPC .............. H04W 72/042; H04B 7/2656; H04B 1/70735; H04J 11/0069; H04L 27/2613; H04L 7/043; H04L 27/2655
USPC .................................. 370/328, 509; 455/502
See application file for complete search history.

(56) References Cited

U.S. PATENT DOCUMENTS 6,822,999 B1   11/2004   Lee et al.
6,888,880 B2    5/2005   Lee et al.
(Continued)

FOREIGN PATENT DOCUMENTS

CN       1494809       5/2004
CN       1669264       9/2005
(Continued)

OTHER PUBLICATIONS

Ericsson, "Information mapping on the Secondary Synchronization SIgnal," 3GPP TSG-RAN WG 1 Meeting #50, R1-073736, 12 pages, (2007).
(Continued)

*Primary Examiner* — Paul H Masur
*Assistant Examiner* — Kabir Jahangir
(74) *Attorney, Agent, or Firm* — Nelson Mullins Riley & Scarborough LLP

(57) ABSTRACT

A method is provided for searching for a cell in a mobile station. The method includes receiving a downlink frame including a primary synchronization signal and a secondary synchronization signal. The secondary synchronization signal contains cell identity group information and the primary synchronization signal contains cell identity information within a cell identity group. The method also includes searching for a cell using the cell identity group information in the secondary synchronization signal and the cell identity information in the primary synchronization sign.

20 Claims, 7 Drawing Sheets

(51) Int. Cl.
*H04J 11/00* (2006.01)
*H04L 7/04* (2006.01)
*H04L 27/26* (2006.01)
*H04B 1/7073* (2011.01)

(52) U.S. Cl.
CPC ............ *H04L 7/043* (2013.01); *H04L 27/2613* (2013.01); *H04B 1/70735* (2013.01); *H04L 27/2655* (2013.01)

(56) References Cited

U.S. PATENT DOCUMENTS

| | | | |
|---|---|---|---|
| 7,158,595 | B2 | 1/2007 | Yang et al. |
| 7,161,988 | B2 | 1/2007 | Lee et al. |
| 7,221,695 | B1 | 5/2007 | Hwang et al. |
| 7,236,468 | B2 | 6/2007 | Ryu et al. |
| 7,386,055 | B2 | 6/2008 | Morita et al. |
| 7,969,964 | B2 | 6/2011 | Kim et al. |
| 8,125,976 | B2 | 2/2012 | Chang et al. |
| 2002/0044538 | A1 | 4/2002 | Lee |
| 2002/0048315 | A1 | 4/2002 | Hanada et al. |
| 2003/0193922 | A1 | 10/2003 | Ho et al. |
| 2005/0088987 | A1 | 4/2005 | Ryu |
| 2006/0045000 | A1 | 3/2006 | Morlier et al. |
| 2006/0062185 | A1 | 3/2006 | Darwood et al. |
| 2006/0114812 | A1 | 6/2006 | Kim et al. |
| 2006/0146867 | A1 | 7/2006 | Lee et al. |
| 2006/0209670 | A1 | 9/2006 | Gorokhov et al. |
| 2007/0041348 | A1 | 2/2007 | Kwun et al. |
| 2007/0133386 | A1 | 6/2007 | Kim et al. |
| 2008/0019314 | A1 | 1/2008 | Gorokhov et al. |
| 2008/0019350 | A1 | 1/2008 | Onggosanusi et al. |
| 2008/0043702 | A1 | 2/2008 | Moon et al. |
| 2008/0107086 | A1 | 5/2008 | Fukuta et al. |
| 2008/0212462 | A1 | 9/2008 | Ahn et al. |
| 2008/0273522 | A1 | 11/2008 | Luo et al. |
| 2008/0285433 | A1 | 11/2008 | Akita et al. |
| 2008/0285529 | A1 | 11/2008 | Kwak et al. |
| 2008/0291945 | A1 | 11/2008 | Luo |
| 2009/0067370 | A1 | 3/2009 | Kim et al. |
| 2009/0086669 | A1 | 4/2009 | McCoy et al. |
| 2009/0219883 | A1 | 9/2009 | Cho et al. |
| 2009/0310782 | A1 | 12/2009 | Dabak et al. |
| 2009/0323642 | A1 | 12/2009 | Tanno et al. |
| 2010/0135257 | A1 | 6/2010 | Higuchi et al. |
| 2011/0009138 | A1 | 1/2011 | Kim et al. |
| 2011/0129008 | A1 | 6/2011 | Chmiel et al. |

FOREIGN PATENT DOCUMENTS

| | | |
|---|---|---|
| CN | 1879321 | 12/2006 |
| CN | 1957539 | 5/2007 |
| EP | 1432265 A1 | 6/2004 |
| EP | 1453232 A1 | 9/2004 |
| JP | 2011-250457 | 12/2011 |
| KR | 1020060037101 | 5/2006 |
| KR | 1020070025944 | 3/2007 |
| KR | 1020070039760 | 4/2007 |
| KR | 1020070050338 | 5/2007 |
| WO | 2005/043791 A2 | 5/2005 |
| WO | 2006/134829 A1 | 12/2006 |
| WO | 2007/029958 A1 | 3/2007 |
| WO | WO 2007029958 A1 * | 3/2007 |
| WO | 2007/055526 A1 | 5/2007 |
| WO | WO 2007055526 A1 * | 5/2007 |
| WO | 2007/073116 A1 | 6/2007 |
| WO | 2009/008679 A2 | 1/2009 |
| WO | 2009/014354 A1 | 1/2009 |

OTHER PUBLICATIONS

ETRI, "Comparison of S-SCH mapping methods," 3GPP TSG WG1 #50bis, R1-074052 (2007).
ETRI, "Design of S-SCH sequences," 3GPP TSG RAN1 WG1 #49bis, R1-072811, 5 pages (2007).
ETRI, "S-SCH Scrambling Methods," 3GPP TSG RAN WG1 Meeting #50bis, R1-074053 (2007).
LG Electronics, "Time-domain PSC design using Zadoff-Chu sequence," 3GPP TSG RAN WG1 #48 bis, R1-071530, 13 references, (2007).
Marvell Semiconductor, "SSCH Mapping to Group ID and Frame Timing," 3GPP TSG RAN WG1 #50bis, R1-074485 (2007).
MCC Support, "Draft Report of 3GPP TSG RAN WG1 #49b v0.3.0," 3GPP TSG RAN WG1 Meeting #50, R1-073815, 4 pages (2007).
Motorola, "Cell Search E-mail Reflector Summary," 3GPP TSG RAN1#50, R1-073401, 1 page (2007).
Motorola, "Scrambling Method for Two S-SCH Short Code," 3GPP TSG RAN WG1 Meeting #49bis, R1-072661 (2007).
Nortel, "Scrambling Code Designs for S-SCH," 3GPP TSG-RAN WG1 Meeting #50, R1-073307, 6 pages (2007).
NTT DoCoMo, Mitsubishi Electric, Sharp, Toshiba Corporation, "S-SCH Structure for E-UTRA Downlink," 3GPP TSG RAN WG1 Meeting #49, R1-072598 (2007).
NTT DoCoMo et al., "Scrambling Method for S-SCH in E-UTRA Downlink," 3GPP TSG Ran WG1 Meeting #49bis, R1-072940, 4 pages, (2007).
NTT DoCoMo et al., "S-SCH Structure for E-UTRA Downlink," 3GPP TSG RAN WG1 Meeting #49bis, R1-072941, 6 pages (2007).
ZTE, "Scrambling Method for S-SCH," 3GPP TSG-RAN WG1 #49bis, R1-072910 (2007).
Supplementary European Search Report for Application No. 08778878.2, dated Feb. 15, 2010.
Ericsson, "Synchronization signals for LTE," 3GPP TSG-RAN WG 1 Meeting #49bis, R1-073023, 6 pages, (2007).
ETRI, "Cell Search approach 1: Further considerations," 3GPP TSG RAN1 WG1 #47, R1-063520, 6 pages, (2006).
ETRI, "S-SCH scrambling and mapping methods," 3GPP TSG RAN1 WG1 #50, R1-073414, 8 pages, (2007).
ETRI, "S-SCH scrambling and mapping methods," 3GPP TSG RAN1 WG1 #50, R1-073798, 8 pages, (2007).
Huawei, "Scrambling and information encoding for the S-SCH," TSG RAN WG1 meeting #50, R1-073514, 6 pages, (2007).
LG Electronics, "SSC mapping and scrambling method," 3GPP RSG RAN WG1 #50, R1-073496, 9 pages, (2007).
Nokia Siemens Networks, Nokia, "On the multiplexing structure of the primary broadcast channel," 3GPP TSG RAN WG1 #49bis Meeting, R1-072962, 8 pages, (2007).
Sharp, "Proposed Scrambling sequences for S-SCH with embedded frame timing derivation," 3GPP TSG RAN WG1 Meeting #50, R1-073323, 12 pages, (2007).
ZTE, CATT, "System Information Mapping Scheme for S-SCH Sequences," 3GPP TSG-RAN WG1 #50, R1-073590, 6 pages, (2007).
3GPP TS 36.211 V8.1.0, "Synchronization signals," Chapter 6.11, pp. 46-49 (2007).
3GPP TS 36.211 V8.2.0, "Synchronization signals," Chapter 6.11, pp. 57-60 (2008).

* cited by examiner

FIG. 2
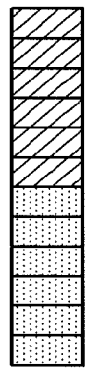
Secondary synchronization
channel of slot 0
Secondary synchronization
channel of slot 10
▨ : First sequence
▦ : Second sequence
▧ : Third sequence
▩ : Fourth sequence
FIG. 3
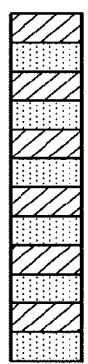
Secondary synchronization
channel of slot 0
Secondary synchronization
channel of slot 10
▨ : First sequence
▦ : Second sequence
▧ : Third sequence
▩ : Fourth sequence FIG. 6
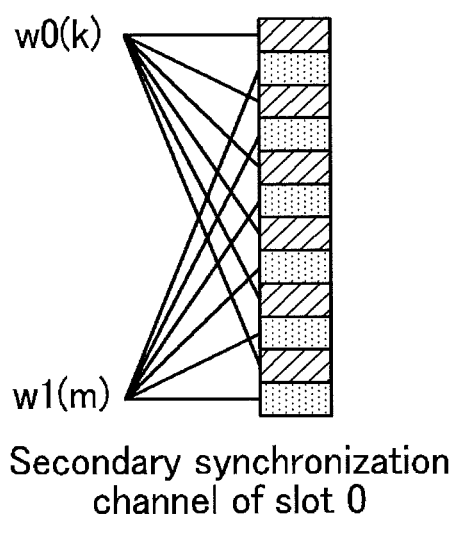
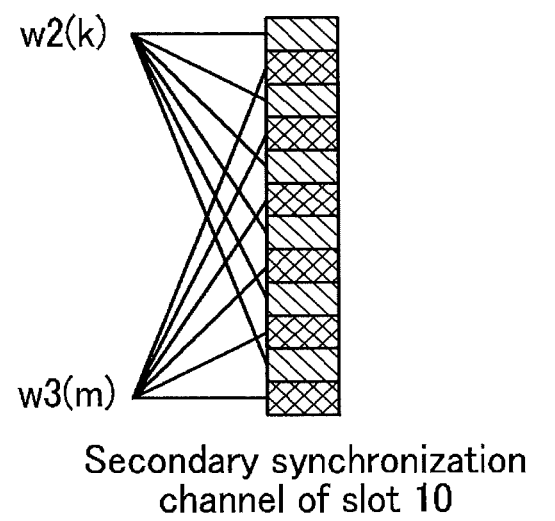
Secondary synchronization channel of slot 0
Secondary synchronization channel of slot 10
▨ : First sequence
▧ : Third sequence
▦ : Second sequence
▩ : Fourth sequence Secondary synchronization channel of slot 0

Secondary synchronization channel of slot 10

▨ : First sequence    ▨ : Third sequence
▨ : Second sequence   ▨ : Fourth sequence Secondary synchronization channel of slot 0

Secondary synchronization channel of slot 10

▨ : First sequence    ▨ : Third sequence
▨ : Second sequence   ▨ : Fourth sequence

GENERATING DOWNLINK FRAME AND SEARCHING FOR CELL

CROSS-REFERENCE TO RELATED APPLICATION

This application is a continuation of U.S. patent application Ser. No. 12/488,272 filed on Jun. 19, 2009, which is a continuation of PCT application No. PCT/KR2008/004223 filed on Jul. 18, 2008, which claims priority to, and the benefit of, Korean Patent Application No. 10-2007-0072837 filed on Jul. 20, 2007, Korean Patent Application No. 10-2007-0083915 filed on Aug. 21, 2007, Korean Patent Application No. 10-2008-0042907 filed on May 8, 2008, Korean Patent Application No. 10-2008-0063388 filed on Jul. 1, 2008. The entire contents of the aforementioned applications are incorporated herein by reference.

BACKGROUND (a) Field

The present application relates to a method of generating a downlink frame and a method of searching for cells. More particularly, the present application relates to a method of generating a downlink frame and a method of searching for cells by using the downlink frame in an orthogonal frequency division multiplexing (OFDM)-based cellular system.

(b) Description of the Related Art

In a direct sequence code division multiple access (DS-CDMA) system, a sequence hopping method is applied to a pilot channel so as to acquire cell synchronization and unique cell identification information. According to the sequence hopping method, a mobile station easily performs a cell search without a separating synchronization channel by introducing a sequence hopping technology to the pilot channel. However, in the OFDM system, a number of channels that are capable of being distinguished by a frequency domain in a symbol duration of one time domain is greater than that of those that are capable of being distinguished by a spread of CDMA in the symbol duration of one time domain. Accordingly, when only the time domain is used, resources may be wasted in terms of capacity. For this reason, it is inefficient to directly apply the sequence hopping method to the time domain of the pilot channel in the OFDM-based system. Therefore, it is preferable to search for the cell by efficiently using received signals in both time domain and frequency domain.

An example of an existing technology for searching for a cell in the OFDM system includes a method that allocates synchronization information and cell information by dividing one frame into four time blocks. For the above-described method, two frame structures have been proposed. In a first frame structure, synchronization identification information, cell group identification information, and cell unique identification information are allocated to four time blocks, respectively. In a second frame structure, the synchronization identification information and the cell unique identification information are allocated to a first time block and a third time block, and the synchronization identification information and the cell group identification information are allocated to a second time block and a fourth time block.

According to the first frame structure, since the symbol synchronization is acquired in only the first time block, it is impossible for the mobile station to conduct rapid synchronization acquisition within a prescribed 5 ms during power-on or handover between heterogeneous networks. In addition, it is difficult to acquire diversity gain by accumulating synchronization identification information so as to conduct rapid synchronization acquisition.

According to the second frame structure, the unique cell identification information or the cell group identification information is correlated along with the synchronization acquisition. Therefore, a cell searching process is complex and a rapid cell search is difficult.

As an example of another technology for searching for the cell, a method of acquiring the synchronization and searching for the cell by using a separate preamble has been proposed. However, this method cannot be applied to a system in which the preamble does not exist. Moreover, the preamble is disposed in front of the frame. Accordingly, in a case in which the mobile station would like to acquire the synchronization at a time location that is not the start of the frame, there is a problem in that it must wait for the next frame. Particularly, the mobile station should acquire initial symbol synchronization within 5 msec during the handover among a GSM mode, a WCDMA mode, and a 3GPP LTE mode, but may acquire the synchronization by a frame unit. For this reason, in some cases, the mobile station cannot acquire the initial symbol synchronization within 5 msec.

As an example of another technology for searching for a cell, there is a method of searching for the cell by allocating two short sequences to a secondary synchronization channel and by mapping cell ID information to a combination of two short sequences. According to this method, since interference occurs between cells when the same short sequence is allocated to sectors adjacent to each other, there is a problem in that performance in searching cells is reduced.

SUMMARY

The present application has been made in an effort to provide a method of generating a downlink frame that is capable of averaging interference between sectors and a method of efficiently searching for cells by receiving the downlink frame.

An exemplary embodiment provides a method of generating a downlink frame, including: generating a first short sequence and a second short sequence indicating cell group information; generating a first scrambling sequence and a second scrambling sequence determined by the primary synchronization signal; generating a third scrambling sequence determined by the first short sequence and a fourth scrambling sequence determined by the second short sequence; scrambling the first short sequence with the first scrambling sequence and scrambling the second short sequence with the second scrambling sequence and the third scrambling sequence; scrambling the second short sequence with the first scrambling sequence and scrambling the first short sequence with the second scrambling sequence and the fourth scrambling sequence; and mapping the secondary synchronization signal that includes the first short sequence scrambled with the first scrambling sequence, the second short sequence scrambled with the second scrambling sequence and the third scrambling sequence, the second short sequence scrambled with the first scrambling sequence and the first short sequence scrambled with the second scrambling sequence and the fourth scrambling sequence to a frequency domain.

Another embodiment provides an apparatus for generating a downlink frame including: a sequence generating unit that generates a first short sequence and a second short sequence indicating cell group information, a first scrambling sequence and a second scrambling sequence determined by the primary synchronization signal, a third scrambling sequence determined by the first short sequence and a fourth scrambling sequence determined by the second short sequence; and a synchronization signal generating unit that scrambles the first short sequence with the first scrambling sequence and scrambles the second short sequence with the second scrambling sequence and the third scrambling sequence to generate one secondary synchronization signal, and scrambles the second short sequence with the first scrambling sequence and scrambles the first short sequence with the second scrambling sequence and the fourth scrambling sequence to generate the other secondary synchronization signal.

Yet another embodiment provides a method of searching for a cell, including: receiving a downlink frame including a primary synchronization signal and two secondary synchronization signal which are different from each other; and estimating information of a cell by using the primary synchronization signal and the two secondary synchronization signal. In this case, in one secondary synchronization signal of the two secondary synchronization signal, a first short sequence scrambled with a first scrambling sequence and a second short sequence scrambled with a second scrambling sequence and a third scrambling sequence are alternately disposed on a plurality of sub-carriers, in the other secondary synchronization signal of the two secondary synchronization signal, a second short sequence scrambled with a first scrambling sequence and a first short sequence scrambled with a second scrambling sequence and a fourth scrambling sequence are alternately disposed on a plurality of sub-carriers, and the first short sequence and the second short sequence indicate cell group information, the first scrambling sequence and the second scrambling sequence are determined by the primary synchronization signal, the third scrambling sequence is determined by the first short sequence, and the fourth scrambling sequence is determined by the second short sequence.

Still another embodiment provides an apparatus for searching for a cell, including: a receiving unit that receives a downlink frame including a primary synchronization signal and two secondary synchronization signals which are different from each other; a cell group estimating unit that identifies a cell group by using the two secondary synchronization signal; and a cell estimating unit that identifies a cell in the cell group by using the primary synchronization signal. In this case, in one secondary synchronization signal of the two secondary synchronization signal, a first short sequence scrambled with a first scrambling sequence and a second short sequence scrambled with a second scrambling sequence and a third scrambling sequence are alternately disposed on a plurality of sub-carriers, and in the other secondary synchronization signal of the two secondary synchronization signal, a second short sequence scrambled with a first scrambling sequence and a first short sequence scrambled with a second scrambling sequence and a fourth scrambling sequence are alternately disposed on a plurality of sub-carriers, and the first short sequence and the second short sequence indicate cell group information, the first scrambling sequence and the second scrambling sequence are determined by the primary synchronization signal, the third scrambling sequence is determined by the first short sequence and the fourth scrambling sequence is determined by the second short sequence.

Still another embodiment provides a recording medium that records a program for executing the method of generating the downlink frame. The recording medium records a program including: generating a first short sequence and a second short sequence indicating cell group information; generating a first scrambling sequence and a second scrambling sequence determined by the primary synchronization signal; generating a third scrambling sequence determined by the first short sequence and a fourth scrambling sequence determined by the second short sequence; scrambling the first short sequence with the first scrambling sequence and scrambling the second short sequence with the second scrambling sequence and the third scrambling sequence; scrambling the second short sequence with the first scrambling sequence and scrambling the first short sequence with the second scrambling sequence and the fourth scrambling sequence; and mapping the secondary synchronization signal that includes the first short sequence scrambled with the first scrambling sequence and the second short sequence scrambled with the second scrambling sequence and the third scrambling sequence, the second short sequence scrambled with the first scrambling sequence and the first short sequence scrambled with the second scrambling sequence and the fourth scrambling sequence to a frequency domain.

According to the above-mentioned embodiment, interference between sectors can be reduced by scrambling the short sequences due to the scrambling sequences, thereby improving performance for searching for cells.

BRIEF DESCRIPTION OF THE DRAWINGS

FIG. 2 is a diagram illustrating a configuration of a secondary synchronization channel when two sequences are mapped to a frequency domain in a localization form.

FIG. 3 is a diagram illustrating a configuration of a secondary synchronization channel when two sequences are mapped to a frequency domain in a distribution form.

FIG. 6 is a diagram illustrating a first method of generating a secondary synchronization signal according to the exemplary embodiment.

DETAILED DESCRIPTION

Figure 1:
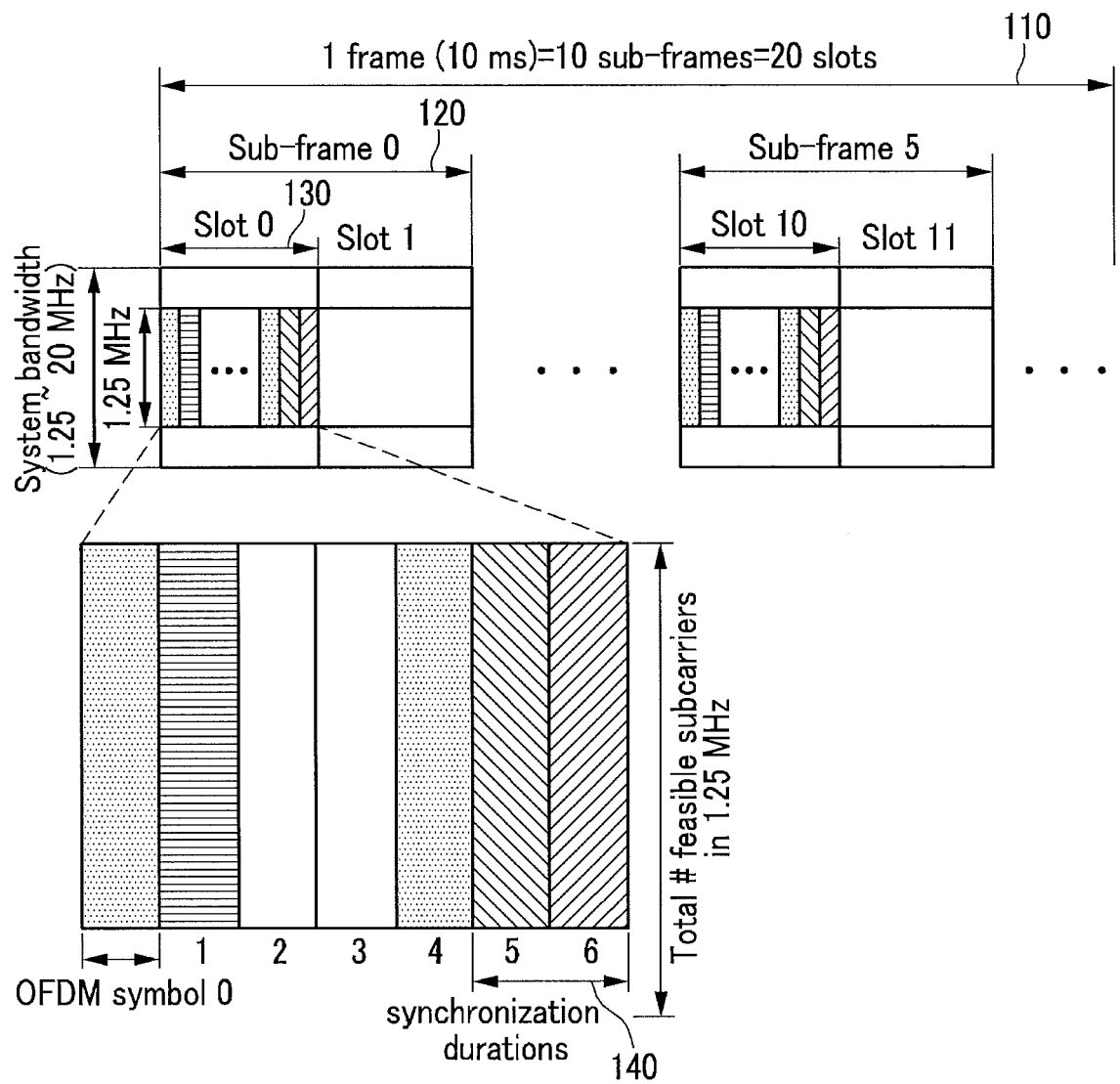
FIG. 1 is a diagram illustrating a downlink frame in an OFDM system according to an exemplary embodiment.

In the following detailed description, only certain exemplary embodiments have been shown and described, simply by way of illustration. As those skilled in the art would realize, the described embodiments may be modified in various different ways, all without departing from the spirit or scope of the present application. In addition, parts that are irrelevant to the description of the present application are omitted in the drawings, to clarify the invention. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the term "unit" described in the specification means a unit for processing at least one function and operation, and can be implemented by hardware components or software components and combinations thereof.

First, referring to FIGS. 1 to 3, a downlink frame of an OFDM system and a configuration of a synchronization channel according to an exemplary embodiment will be described.

FIG. 1 is a diagram illustrating a downlink frame of an OFDM system according to an exemplary embodiment. In FIG. 1, a horizontal axis represents a time axis and a vertical axis represents a frequency axis or sub-carrier axis.

As shown in FIG. 1, a downlink frame 110 according to the exemplary embodiment has a time duration of 10 msec and includes ten sub-frames 120. Each sub-frame 120 has a time duration of 1 msec and includes two slots 130. Each slot 130 includes six or seven OFDM symbols. The length of a cyclic prefix in a case in which one slot includes six symbols is greater than that of a cyclic prefix in a case in which one slot includes seven symbols.

As shown in FIG. 1, the downlink frame 110 according to the exemplary embodiment includes two synchronization durations 140 in total, including synchronization durations 140 in slot No. 0 and slot No. 10, respectively. However, it is not necessarily limited thereto. The downlink frame 110 may include a synchronization duration in any slot, and may include one synchronization duration or three or more synchronization durations. Since the length of the cyclic prefix may be different in each slot, it is preferable that the synchronization duration is located at an end of the slot.

Each slot includes a pilot duration.

The synchronization duration according to the exemplary embodiment includes a primary synchronization channel and a secondary synchronization channel, and the primary synchronization channel and the secondary synchronization channel are disposed so as to be adjacent to each other in view of time. As shown in FIG. 1, the primary synchronization channel is located at the end of the slot, and the secondary synchronization channel is located right ahead of the primary synchronization channel.

The primary synchronization channel includes a primary synchronization signal having information for identifying symbol synchronization and frequency synchronization, and some information for cell identification(ID). The secondary synchronization channel includes a secondary synchronization signal having remaining information for the cell ID, and information for identifying frame synchronization. A mobile station identifies the cell ID of cell by combining the cell ID information of the primary synchronization channel and the cell ID information of the secondary synchronization channel.

For instance, assuming that the total number of cell IDs is 510, if three identification sequences are allocated to the primary synchronization channel to divide all 510 cell IDs into three groups and if 170 sequences are allocated to the secondary synchronization channel (3×170=510), the information on all of the 510 cell IDs can be represented.

Another method is that the 510 cell IDs are divided into 170 groups by using 170 secondary synchronization signals that are allocated to the secondary synchronization channel, and information on cell IDs in each cell group can be represented by three primary synchronization signals that are allocated to the primary synchronization channel.

Since the secondary synchronization channel includes the information for identifying the frame synchronization as well as information for the cell ID, two secondary synchronization channels included in one frame are different from each other.

FIG. 2 is a diagram illustrating a configuration of a secondary synchronization channel when two short sequences are mapped to a frequency domain in a localization form, and FIG. 3 is a diagram illustrating a configuration of a secondary synchronization channel when two short sequences are mapped to a frequency domain in a distribution form.

Referring to FIG. 2 to FIG. 3, a secondary synchronization signal, which is inserted into a secondary synchronization channel, according to an exemplary embodiment is formed by combining two short sequences. Cell group information and frame synchronization information are mapped to the two short sequences.

As shown in FIG. 2, a first short sequence may be locally allocated to sub-carriers, and then the second short sequence may be locally allocated to remaining sub-carriers. In addition, as shown in FIG. 3, the first short sequence may be allocated to every even-numbered sub-carriers (n=0, 2, 4, ..., 60), and the second short sequence may be allocated to every odd-numbered sub-carrier (n=1, 3, 5, ..., 61).

The short sequence length corresponds to half of the number of sub-carriers allocated to the secondary synchronization channel. That is, the number of short sequence elements that can be generated is up to half of the number of sub-carriers allocated to the secondary synchronization channel. For instance, when the number of sub-carriers allocated to the secondary synchronization channel is 62, the short sequence length corresponds to 31 and the number of short sequence elements that can be generated is up to 31.

Since two short sequences are allocated to each secondary synchronization channel, the number of secondary synchronization sequences generated by a combination of two short sequences is 961 (=31×31) at maximum. However, since the information that should be included in the secondary synchronization channel is cell group information and frame boundary information, 170 or 340 (=170×2) secondary synchronization sequences are required. Accordingly, the number 961 is a sufficiently large value in comparison with the number 170 or 340.

Figure 4:
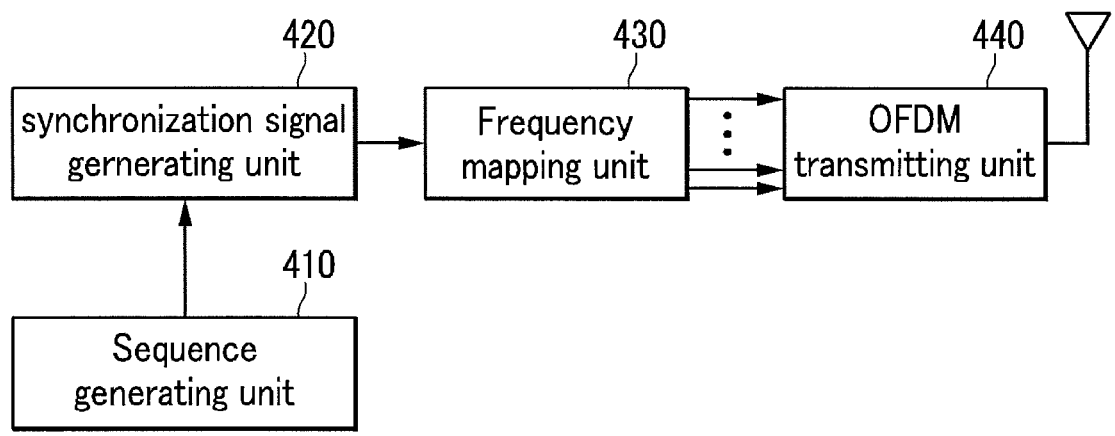
FIG. 4 is a block diagram of an apparatus for generating a downlink frame according to the exemplary embodiment.

Next, an apparatus for generating a downlink frame according to an exemplary embodiment will be described with reference to FIG. 4. FIG. 4 is a block diagram of the apparatus for generating the downlink frame according to the exemplary embodiment.

As shown in FIG. 4, the apparatus for generating the downlink frame according to the exemplary embodiment of includes a sequence generating unit 410, a synchronization signal generating unit 420, a frequency mapping unit 430, and an OFDM transmitting unit 440.

The sequence generating unit 410 generates a sequence for acquiring time and frequency synchronization, a cell identification sequence, a plurality of short sequences, and a scrambling sequence for reducing adjacent cell interference, respectively, and transmits them to the synchronization signal generating unit 420.

The synchronization signal generating unit 420 generates a primary synchronization signal, a secondary synchronization signal, and a pilot pattern by using sequences received from the sequence generating unit 410.

The synchronization signal generating unit 420 generates the primary synchronization signal by using the sequence for acquiring time and frequency synchronization and the cell identification sequence. In addition, the synchronization signal generating unit 420 generates the secondary synchronization signal by using the plurality of short sequences and the scrambling sequences for reducing adjacent cell interference.

The synchronization signal generating unit 420 generates the pilot pattern of downlink signals by allocating a unique scrambling sequence allocated to each cell for encoding a common pilot symbol and data symbol of a cellular system to the pilot channel.

The frequency mapping unit 430 generates the downlink frame by mapping the primary synchronization signal, the secondary synchronization signal, and the pilot pattern that are generated from the synchronization signal generating unit 420 and frame control information and transmission traffic data that are transmitted from external sources to the time and frequency domains.

The OFDM transmitting unit 440 receives the downlink frame from the frequency mapping unit 430 and transmits the downlink frame through given transmission antenna.

Figure 5:
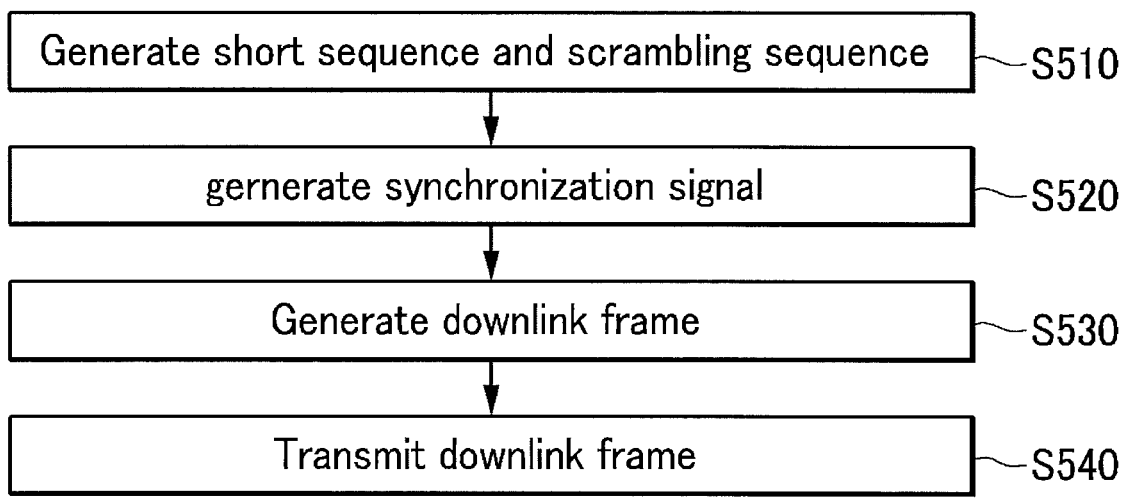
FIG. 5 is a flowchart illustrating a method of generating a downlink frame according to the exemplary embodiment.

Referring to FIG. 5 to FIG. 8, a method of generating a downlink frame according to an exemplary embodiment will be described. FIG. 5 is a flowchart illustrating the method of generating the downlink frame according to the exemplary embodiment.

As shown in FIG. 5, the sequence generating unit 410 generates a plurality of short sequences and a plurality of scrambling sequences for reducing interference of a plurality of adjacent cells and transmits them to the synchronization signal generating unit 420 (S510).

The synchronization signal generating unit 420 generates a secondary synchronization signal by using the short sequences and the scrambling sequences for reducing interference of the plurality of adjacent cells received from the sequence generating unit 410 (S520). In the exemplary embodiment, it is described that one frame includes two secondary synchronization channels. However, it is not limited thereto.

Figure 7:
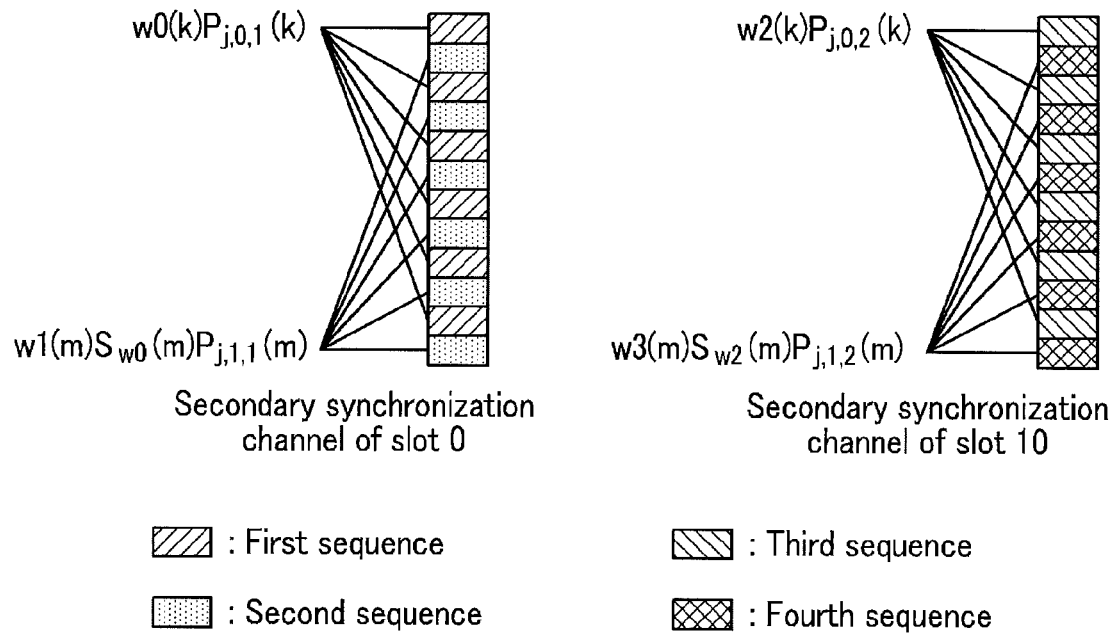
FIG. 7 is a diagram illustrating a second method of generating a secondary synchronization signal according to the exemplary embodiment.
Figure 8:
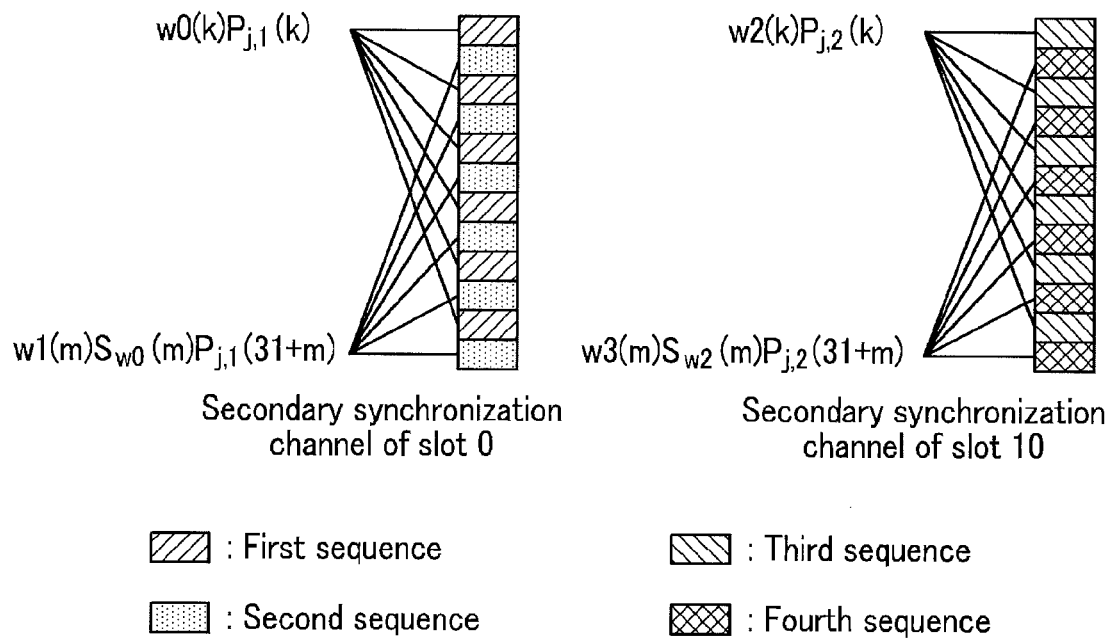
FIG. 8 is a diagram illustrating a third method of generating a secondary synchronization signal according to the exemplary embodiment.

Referring to FIG. 6 to FIG. 8, three different methods of generating a secondary synchronization signal according to an exemplary embodiment will be described. FIG. 6 is a diagram illustrating the first method of generating a secondary synchronization signal according to the exemplary embodiment, FIG. 7 is a diagram illustrating the second method of generating a secondary synchronization signal according to the exemplary embodiment, and FIG. 8 is a diagram illustrating the third method of generating a secondary synchronization signal according to the exemplary embodiment.

A short sequence (wn) is a binary sequence (or binary code) representing cell group information. That is, the short sequence (wn) is the binary sequence allocated to a cell group number and frame synchronization. Moreover, the length of the short sequence corresponds to half of the number of sub-carriers allocated to the secondary synchronization channel. In the exemplary embodiment, it is described that the number of sub-carriers allocated to the secondary synchronization channel is 62. However, it is not limited thereto. Accordingly, the short sequence length according to the exemplary embodiment is 31.

The first short sequence w0 is allocated to even-numbered sub-carriers of the first secondary synchronization channel and is defined as given in Equation 1.

$$w0=[w0(0), w0(1), \ldots, w0(k), \ldots, w0(30)] \quad \text{(Equation 1)}$$

Here, k denotes an index of the even-numbered sub-carriers used for a secondary synchronization channel.

The second short sequence w1 is allocated to odd-numbered sub-carriers of the first secondary synchronization channel and is defined as given in Equation 2.

$$w1=[w1(0), w1(1), \ldots, w1(m), \ldots, w1(30)] \quad \text{(Equation 2)}$$

Here, m denotes an index of the odd-numbered sub-carriers used for the secondary synchronization channel.

The third short sequence w2 is allocated to even-numbered sub-carriers of the second secondary synchronization channel and is defined as given in Equation 3.

$$w2=[w2(0), w2(1), \ldots, w2(k), \ldots, w2(30)] \quad \text{(Equation 3)}$$

The fourth short sequence w3 is allocated to odd-numbered sub-carriers of the second secondary synchronization channel and is defined as given in Equation 4.

$$w3=[w3(0), w3(1), \ldots, w3(m), \ldots, w3(30)] \quad \text{(Equation 4)}$$

Here, the short sequences w0, w1, w2, and w3 may be different sequences. In addition, the relationship between the short sequences w0, w1, w2, and w3 may be represented as w0=w3 and w1=w2 (or w0=w2 and w1=w3). Given that w0=w3 and w1=w2, then the pattern of short sequences allocated to the second secondary synchronization channel can be determined only through the pattern of short sequences allocated to the first secondary synchronization channel. Accordingly, by storing only 170 secondary synchronization sequences generated by a combination of two short sequences allocated to the first secondary synchronization channel, a mobile station can reduce the complexity needed to obtaining the cell group information and frame boundary information.

According to the first method of generating a secondary synchronization signal as shown in FIG. 6, the first short sequence is allocated to every even-numbered sub-carrier of the first secondary synchronization channel and the second short sequence is allocated to every odd-numbered sub-carrier of the first secondary synchronization channel. In addition, the third short sequence is allocated to every even-numbered sub-carrier of the second secondary synchronization channel and the fourth short sequence is allocated to every odd-numbered sub-carrier of the second secondary synchronization channel.

According to the first method of generating the secondary synchronization signal, the secondary synchronization signal is formed by a combination of two short sequences having the length of 31. Accordingly, the number of secondary synchronization signals is 961 which is a sufficiently large value in comparison with the number 170 or 340.

According to the second method of generating the secondary synchronization signal shown in FIG. 7, a first sequence determined by Equation 5 is allocated to every even-numbered sub-carrier of the first secondary synchronization channel(slot 0), and a second sequence determined by Equation 6 is allocated to every odd-numbered sub-carrier of the first secondary synchronization channel(slot 0). In addition, a third sequence determined by Equation 7 is allocated to every even-numbered sub-carrier of the second secondary synchronization channel(slot 10), and a fourth sequence determined by Equation 8 is allocated to every odd-numbered sub-carrier of the second secondary synchronization channel(slot 10).

A scrambling sequence $P_{j,0,1}$ scrambling the first short sequence w0 is defined by $P_{j,0,1}=[P_{j,0,1}(0), P_{j,0,1}(1), \ldots, P_{j,0,1}(k), \ldots, P_{j,0,1}(30)]$, where j (j=0, 1, 2) is the number of the cell identification sequence allocated to the primary synchronization channel. Accordingly, the scrambling sequence $P_{j,0,1}$ is determined by the primary synchronization signal. The scrambling sequence $P_{j,0,1}$ is a known value when a sequence is demapped to find a cell ID group and a frame boundary in the mobile station.

As indicated in Equation 5, each element of a first sequence $c_0$ according to the second method of generating the secondary synchronization signal is a product of each element of the first short sequence w0 and each element of the scrambling sequence $P_{j,0,1}$ corresponding thereto.

$$c_0=[w0(0)P_{j,0,1}(0), w0(1)P_{j,0,1}(1), \ldots, w0(k)P_{j,0,1}(k), \ldots, w0(30)P_{j,0,1}(30)] \quad \text{(Equation 5)}$$

Here, k denotes an index of the even-numbered sub-carriers used for the secondary synchronization channel.

The scrambling sequence scrambling the second short sequence w1 is $P_{j,1,1}$ and $S_{w0}$.

The scrambling sequence $P_{j,1,1}$ is $P_{j,1,1}=[P_{j,1,1}(0), P_{j,1,1}(1), \ldots, P_{j,1,1}(m), \ldots, P_{j,1,1}(30)]$, where j (j=0, 1, 2) is the number of the cell identification sequence allocated to the primary synchronization channel. Accordingly, the scrambling sequence $P_{j,1,1}$ is determined by the primary synchronization signal. In addition, the scrambling sequence $P_{j,1,1}$ may be the same as the scrambling sequence $P_{j,0,1}$ or may be different from the scrambling sequence $P_{j,0,1}$. When the scrambling sequence $P_{j,1,1}$ is different from the scrambling sequence $P_{j,0,1}$, it can be possible to reduce interference.

The scrambling sequence $P_{j,1,1}$ is a previously known value when a sequence is demapped to find a cell ID group and a frame boundary in the mobile station.

In addition, the scrambling sequence $S_{w0}$ is $S_{w0}=[S_{w0}(0), S_{w0}(1), \ldots, S_{w0}(m), \ldots, S_{w0}(30)]$, and the scrambling sequence $S_{w0}$ is determined by the first short sequence w0.

At this time, a plurality of short sequences are grouped into a plurality of short sequence group and the $S_{w0}$ may be determined by a short sequence group to which the first short sequence is assigned by grouping short sequences.

For example, according to the exemplary embodiment, since the length of the first short sequence is 31, there are 31 short sequences. Accordingly, by assigning the short sequences Nos. 0-7 to the group 0, the short sequences Nos. 8-15 to the group 1, the short sequences Nos. 16-23 to the group 2, and the short sequences Nos. 24-30 to the group 3. Accordingly $S_{w0}$ is determined by mapping a length-31 scrambling code to the group to which the first short sequence number is assigned.

Furthermore, 31 short sequences may be classified into eight groups by grouping the numbers of the first short sequences having the identical remainder when we divide each number of short sequences by 8. That is, by assigning the short sequence number having the remainder of 0 when dividing the short sequence numbers by 8 to the group 0, the short sequence having the remainder of 1 when dividing the short sequence numbers by 8 to the group 1, the short sequence having the remainder of 2 when dividing the short sequence numbers by 8 to the group 2, the short sequence having the remainder of 3 when dividing the short sequence numbers by 8 to the group 3, the short sequence having the remainder of 4 when dividing the short sequence numbers by 8 to the group 4, the short sequence having the remainder of 5 when dividing the short sequence numbers by 8 to the group 5, the short sequence having the remainder of 6 when dividing the short sequence numbers by 8 to the group 6, and the short sequence having the remainder of 7 when dividing the short sequence numbers by 8 to the group 7. Accordingly $S_{w0}$ is determined by mapping a length-31 scrambling code to the group to which the first short sequence number is assigned.

As indicated in Equation 6, each element of a second sequence $c_1$ according to the second method of generating the secondary synchronization signal is a product of each element of the second short sequence w1 and each element of the scrambling sequences $P_{j,1,1}$ and $S_{w0}$ corresponding thereto.

$$c_1=[w1(0)S_{w0}(0)P_{j,1,1}(0), w1(1)S_{w0}(1)P_{j,1,1}(1), \ldots, w1(m)S_{w0}(m)P_{j,1,1}(m), \ldots, w1(30)S_{w0}(30)P_{j,1,1}(30)]$$
(Equation 6)

Herein, m denotes the index of odd-numbered sub-carriers used for the secondary synchronization channel.

A scrambling sequence $P_{j,0,2}$ for scrambling a third short sequence w2 is $[P_{j,0,2}(0), P_{j,0,2}(1), \ldots, P_{j,0,2}(k) \ldots, P_{j,0,2}(30)]$, where j (j=0, 1, 2) is the number of the cell identification sequence allocated to the primary synchronization channel. Accordingly, the scrambling sequence $P_{j,0,2}$ is determined by the primary synchronization signal. In addition, the scrambling sequence $P_{j,0,2}$ is a previously known value when the sequence is demapped to find the cell ID group and frame boundary in the mobile station.

As indicated in Equation 7, each element of a third sequence $c_2$ according to the second method of generating the secondary synchronization signal is a product of each element of the third short sequence w2 and each element of the scrambling sequence $P_{j,0,2}$ corresponding thereto.

$$c_2=[w2(0)P_{j,0,2}(0), w2(1)P_{j,0,2}(1), \ldots, w2(k)P_{j,0,2}(k), \ldots, w2(30)P_{j,0,2}(30)]$$
(Equation 7)

Herein, k denotes the index of even-numbered sub-carriers used for the secondary synchronization channel.

Scrambling sequences for scrambling a fourth short sequence are $P_{j,1,2}$ and $S_{w2}$.

The scrambling sequence $P_{j,1,2}$ is $P_{j,1,2}=[P_{j,1,2}(0), P_{j,1,2}(1), \ldots, P_{j,1,2}(m), \ldots, P_{j,1,2}(30)]$, and j (j=0, 1, 2) is the number of the cell identification sequence allocated to the primary synchronization channel. Accordingly, the scrambling sequence $P_{j,1,2}$ is determined by the primary synchronization signal. The scrambling sequence $P_{j,1,2}$ is a previously known value when a sequence is demapped to find the cell ID group and frame boundary in the mobile station.

Furthermore, the scrambling sequence $S_{w2}$ is $S_{w2}=[S_{w2}(0), S_{w2}(1), S_{w2}(m), \ldots, S_{w2}(30)]$, and the scrambling sequence $S_{w2}$ is determined by the third short sequence w2.

At this time, the $S_{w2}$ may be determined by a short sequence group to which the third short sequence is assigned by grouping short sequences.

For example, according to the exemplary embodiment, since the length of the third short sequence is 31 as well, there are 31 short sequences. Accordingly, by assigning the short sequences Nos. 0-7 to the group 0, the short sequences Nos. 8-15 to the group 1, the short sequences Nos. 16-23 to the group 2, and the short sequences Nos. 24-30 to the group 3. Accordingly $S_{w2}$ is determined by mapping a length-31 scrambling code to the group to which the third short sequence number is assigned.

Furthermore, 31 short sequences may be classified into eight groups by grouping the numbers of the third short sequences having the identical remainder when we divide each number of short sequences by 8. That is, by assigning the short sequence number having the remainder of 0 when dividing the short sequence numbers by 8 to the group 0, the short sequence having the remainder of 1 when dividing the short sequence numbers by 8 to the group 1, the short sequence having the remainder of 2 when dividing the short sequence numbers by 8 to the group 2, the short sequence having the remainder of 3 when dividing the short sequence numbers by 8 to the group 3, the short sequence having the remainder of 4 when dividing the short sequence numbers by 8 to the group 4, the short sequence having the remainder of 5 when dividing the short sequence numbers by 8 to the group 5, the short sequence having the remainder of 6 when dividing the short sequence numbers by 8 to the group 6, and the short sequence having the remainder of 7 when dividing the short sequence numbers by 8 to the group 7. Accordingly $S_{w2}$ is determined by mapping a length-31 scrambling code to the group to which the third short sequence number is assigned.

As indicated in Equation 8, each element of a fourth sequence $c_3$ according to the second method of generating the secondary synchronization signal is a product of each element of the fourth short sequence w3 and each element of the scrambling sequences $P_{j,1,2}$ and $S_{w2}$ corresponding thereto.

$$c_3 = [w3(0)S_{w2}(0)P_{j,1,2}(0), w3(1)S_{w2}(1)P_{j,1,2}(1), \ldots, \\ w3(m)S_{w2}(m)P_{j,1,2}(m), \ldots, w3(30)S_{w2}(30) \\ P_{j,1,2}(30)]$$ (Equation 8)

Herein, m denotes the index of odd-numbered sub-carriers used for the secondary synchronization channel.

Here, the relationship between the scrambling sequences and the short sequences may be set as $P_{j,0,1}=P_{j,0,2}$, $P_{j,1,1}=P_{j,1,2}$, $P_{j,0,1}\neq P_{j,1,1}$, $P_{j,0,2}\neq P_{j,1,2}$, and $w0\neq w1\neq w2\neq w3$ (or $w0=w3$ and $w1=w2$). In this case, the cell group and frame identify information are mapped to the combination of the first to fourth short sequences, and the number of descrambling hypotheses in the mobile station with respect to the scrambling of secondary synchronization channel determined by the cell identification sequence number of the primary synchronization channel is reduced to 3.

Furthermore, the relationship between the scrambling sequences and the short sequences may be set as $P_{j,0,1}\neq P_{j,0,2}$, $P_{j,1,1}\neq P_{j,1,2}$, $P_{j,0,1}\neq P_{j,1,1}$, $P_{j,0,2}\neq P_{j,1,2}$, $w0=w2$, and $w1=w3$. In this case, the cell group information is mapped to the combination of the first short sequence and the second short sequence, and the frame synchronization information is mapped to the scrambling sequences ($P_{j,0,1}$, $P_{j,0,2}$, $P_{j,1,1}$, $P_{j,1,2}$) of the secondary synchronization channel determined by the cell identification sequence number of the primary synchronization channel. Then, the number of descrambling hypotheses of the mobile station with respect to the scrambling of the secondary synchronization channel determined by the cell identification sequence number of the primary synchronization channel is increased to 6. However, the combination number of the cell group identification sequences is reduced to half, and the number of descrambling hypotheses of the mobile station with respect to the scrambling determined by the first and third short sequences is also reduced to half.

As shown in FIG. 8, in the third method of generating a secondary synchronization signal, a first sequence determined by Equation 9 is allocated to every even-numbered sub-carrier of a first secondary synchronization channel, and a second sequence determined by Equation 10 is allocated to every odd-numbered sub-carrier of the first secondary synchronization channel. Moreover, a third sequence determined by Equation 11 is allocated to every even-numbered sub-carrier of a second secondary synchronization channel, and a fourth sequence determined by Equation 12 is allocated to every odd-numbered sub-carrier of the second secondary synchronization channel.

That is, according to the second method of generating the secondary synchronization signal, the first short sequence is scrambled with a first scrambling sequence having the length of 31, which is determined by the cell identification sequence allocated to the primary synchronization channel, and the second short sequence is scrambled with a second scrambling sequence having the length of 31, which is determined by the cell identification sequence allocated to the primary synchronization channel. However, according to the third method of generating the secondary synchronization signal, the first short sequence and the second short sequence are scrambled with a scrambling sequence having the length of 62, which is determined by the cell identification sequence allocated to the primary synchronization channel.

$P_{j,1}$ is the scrambling sequence that scrambles the first short sequence and the second short sequence, and $P_{j,2}$ is the scrambling sequence that scrambles the third short sequence and the fourth short sequence. The scrambling sequences $P_{j,1}$ and $P_{j,2}$ are represented as $P_{j,1}=[P_{j,1}(0), P_{j,1}(1), \ldots, P_{j,1}(k), \ldots, P_{j,1}(61)]$, and $P_{j,2}=[P_{j,2}(0), P_{j,2}(1), \ldots, P_{j,2}(k), P_{j,2}(61)]$.

Here, j (j=0, 1, 2) is the number of the cell identification sequence allocated to the primary synchronization channel. Accordingly, the scrambling sequences $P_{j,1}$ and $P_{j,2}$ are determined by the number of the cell identification sequence allocated to the primary synchronization channel.

According to the third method of generating the secondary synchronization signal, the first sequence $c_0$ is as indicated in Equation 9, the second sequence $c_1$ is as indicated in Equation 10, the third sequence $c_2$ is as indicated in Equation 11, and the fourth sequence $c_3$ is as indicated in Equation 12.

$$c_0 = [w0(0)P_{j,1}(0), w0(1)P_{j,1}(1), \ldots, w0(k) \\ P_{j,1}(k), \ldots, w0(30)P_{j,1}(30)]$$ (Equation 9)

$$c_1 = [w1(0)S_{w0}(0)P_{j,1}(31), \ldots, w1(1)S_{w0}(1)P_{j,1}(32), \\ w1(m)S_{w0}(m)P_{j,1}(31+m), \ldots, w1(30)S_{w0}(30) \\ P_{j,1}(61)]$$ (Equation 10)

$$c_2 = [w2(0)P_{j,2}(0), w2(1)P_{j,2}(1), \ldots, w2(k) \\ P_{j,2}(k), \ldots, w2(30)P_{j,2}(30)]$$ (Equation 11)

$$C_3 = [w3(0)S_{w2}(0)P_{j,2}(31), w3(1)S_{w2}(1)P_{j,2}(32), \ldots, \\ w3(m)S_{w2}(m)P_{j,2}(31+m), \ldots, w3(30)S_{w2}(30) \\ P_{j,2}(61)]$$ (Equation 12)

In Equation 9 to Equation 12, k denotes the index of the even-numbered sub-carriers to be used for the secondary synchronization channel, and m denotes the index of the odd-numbered sub-carriers to be used for the secondary synchronization channel.

The frequency mapping unit 430 generates the downlink frame by mapping the secondary synchronization signal that are generated from the synchronization signal generating unit 420, and transmission traffic data to the time and frequency domains S530.

The OFDM transmitting unit 440 receives the downlink frame from the frequency mapping unit 430 and transmits the downlink frame through given transmission antenna S540.

A method of searching for cells by the mobile station by using the downlink frame generated by the exemplary embodiment will now be described with reference to FIG. 9 and FIG. 11.

Figure 9:
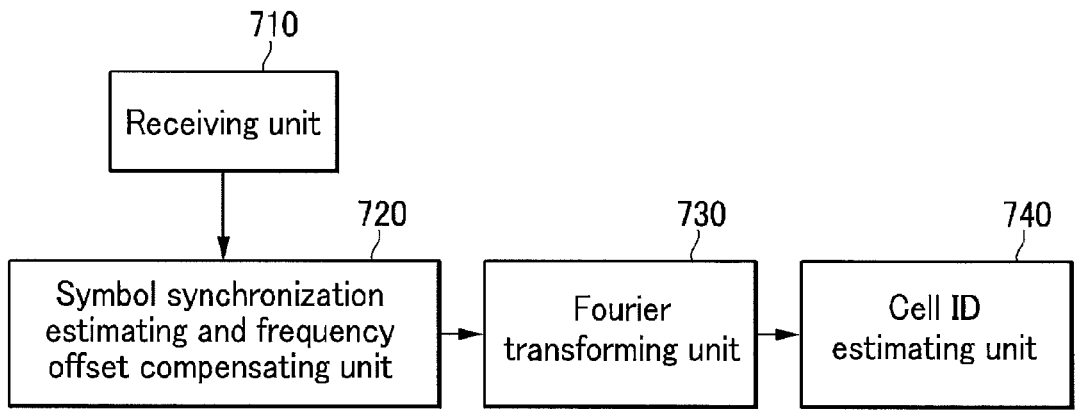
FIG. 9 is a block diagram of an apparatus for searching for cells according to an exemplary embodiment.
Figure 10:
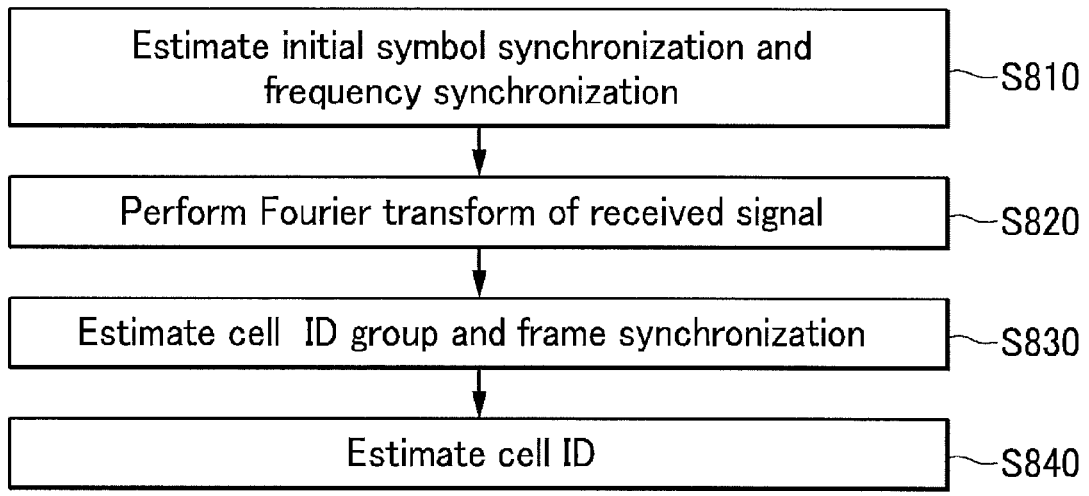
FIG. 10 is a flowchart illustrating a method of searching for a cell according to a first exemplary embodiment.
Figure 11:
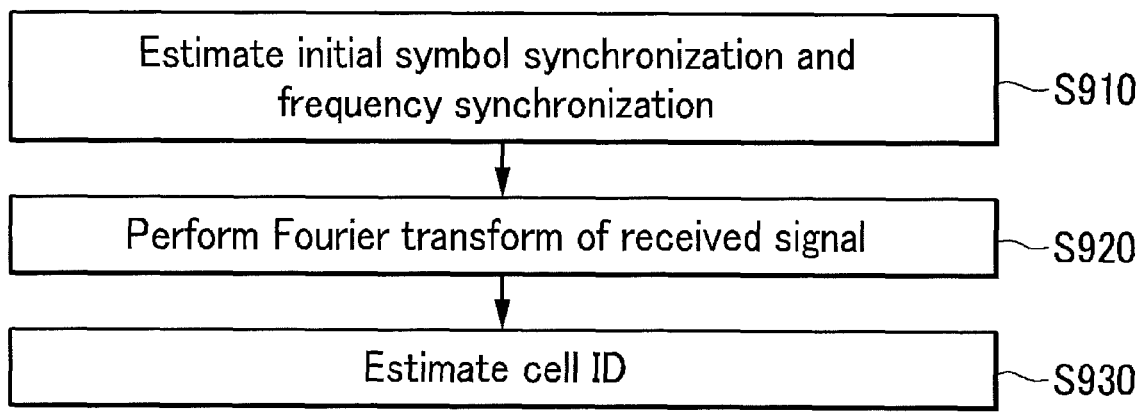
FIG. 11 is a flowchart illustrating a method of searching for a cell according to a second exemplary embodiment.

FIG. 9 is a block diagram of an apparatus for searching for cells according to the exemplary embodiment, FIG. 10 is a flowchart illustrating a cell searching method according to a first exemplary embodiment, and FIG. 11 is a flowchart illustrating a cell searching method according to a second exemplary embodiment.

As shown in FIG. 9, the apparatus for searching for the cells according to the exemplary embodiment includes a receiving unit 710, a symbol synchronization estimating and frequency offset compensating unit 720, a Fourier transforming unit 730, and a cell ID estimating unit 740.

A cell searching method according to the first exemplary embodiment will now be described with reference to FIG. 10.

As shown in FIG. 10, the receiving unit 710 receives the frames transmitted from the base station, and the symbol synchronization estimating and frequency offset compensating unit 720 filters the received signal by as much as a bandwidth allocated to the synchronization channel and acquires the symbol synchronization by respectively correlating the filtered received signal and a plurality of known primary synchronization signals, and compensates the frequency offset by estimating frequency synchronization (S810). The symbol synchronization estimating and frequency offset compensating unit 720 respectively correlates the filtered received signal and the plurality of known primary synchronization signals and estimates a time of the largest correlation value as the symbol synchronization, and transmits a number of a primary synchronization signal having the largest correlation value to the cell ID estimating unit 740. At this time, the frequency offset may be compensated in the frequency domain after performing the Fourier transform.

The Fourier transforming unit 730 performs Fourier transform of the received signals on the basis of the symbol synchronization estimated by the symbol synchronization estimating and frequency offset compensating unit 720 (S820).

The cell ID estimating unit 740 estimates a cell ID group and frame synchronization by respectively correlating the Fourier transformed received signal with a plurality of known secondary synchronization signals S830. The cell ID estimating unit 740 respectively correlates a plurality of secondary synchronization signals with the Fourier transformed received signal, and estimates the frame synchronization and the cell ID group by using a secondary synchronization signal that has the largest correlation value. Herein, the plurality of secondary synchronization signals are given by applying $P_{j,0,1}$, $P_{j,0,2}$, $P_{j,1,1}$ and $P_{j,1,2}$ that are determined in accordance with a primary synchronization signal that corresponds to the number of a primary synchronization signal transmitted from the symbol synchronization estimating and frequency offset compensating unit 720 to Equation 5 to Equation 8. At this time, in the case that a synchronization channel symbol exists in one slot or one OFDM symbol within one frame, the symbol synchronization becomes frame synchronization, and therefore, it is not necessary to additionally acquire frame synchronization.

In addition, the cell ID estimating unit 740 estimates cell IDs by using the number of a primary synchronization signal transmitted from the symbol synchronization estimating and frequency offset compensating unit 720 and the estimated cell ID group S840. At this time, the cell ID estimating unit 740 estimates the cell ID with reference to a known mapping relationship between cell ID, the cell ID group, and a number of primary synchronization signal.

The estimated cell ID information may be verified by using scrambling sequence information included in the pilot symbol duration.

A cell searching method according to the second exemplary embodiment will now be described with reference to FIG. 11.

As shown in FIG. 11, the receiving unit 710 receives a frame transmitted from the base station, and the symbol synchronization estimating and frequency offset compensating unit 720 filters the received signal by as much as a bandwidth allocated to the synchronization channel and acquires the symbol synchronization by respectively correlating the filtered received signal and a plurality of known primary synchronization signals, and compensates the frequency offset by estimating frequency synchronization S910. The symbol synchronization estimating and frequency offset compensating unit 720 respectively correlates the filtered received signal and the plurality of known primary synchronization signals and estimates a time of the largest correlation value as the symbol synchronization, and transmits a plurality of correlation values of the plurality of known primary synchronization signals and filtered received signal to the cell ID estimating unit 740. At this time, the frequency offset compensation may be performed in the frequency domain after Fourier-transformed.

The Fourier transforming unit 730 Fourier-transforms the received signal with reference to the symbol synchronization that is estimated by the symbol synchronization estimating and frequency offset compensating unit 720 S920.

The cell ID estimating unit 740 estimates cell IDs by using the plurality of correlation values transmitted from the symbol synchronization estimating and frequency offset compensating unit 720, and correlation values of the Fourier-transformed received signal and a plurality of known secondary synchronization signals S930. The cell ID estimating unit searches a secondary synchronization signal having the largest correlation value by correlating each of the plurality of known secondary synchronization signals with the Fourier-transformed received signal for each of the plurality of known primary synchronization signals. Here, the plurality of secondary synchronization signals are given by applying $P_{j,0,1}$, $P_{1,0,2}$, $P_{j,1,1}$ and $P_{j,1,2}$ that are determined in accordance with the corresponding primary synchronization signal to Equation 5 to Equation 8.

In addition, the cell ID estimating unit 740 combines the correlation value of each known primary synchronization signal transmitted from the symbol synchronization estimating and frequency offset compensating unit 720 and the correlation value of the secondary synchronization signal having the largest correlation value for each of the plurality of known primary synchronization signals.

The cell ID estimating unit 740 estimates frame synchronization and a cell ID group by using a secondary synchronization signal having the largest combined value among the combined values of the correlation values of a primary synchronization signal and a secondary synchronization signal. In addition, the cell ID estimating unit 740 estimates a cell ID by using the primary synchronization signal having the largest combined value and the estimated cell ID group. At this time, the cell ID estimating unit 740 estimates the cell ID with reference to a known mapping relationship between the cell ID group, cell ID and the primary synchronization signal number.

The exemplary embodiment can be not only implemented by the above-described apparatus and/or method, but can be implemented by, for example, a program that achieves the function corresponding to the configuration of the exemplary embodiment and a recording medium in which the program is recorded. This will be easily implemented from the above-described exemplary embodiment by those skilled in the related art. Examples of the recording medium may include, but not limited to, a read only memory (ROM), a random access memory (RAM), an electrically programmable read-only memory (EEPROM), a flash memory, etc. The program may be executed by one or more hardware processors to achieve the function corresponding to the configuration of the exemplary embodiment. Examples of the hardware processor may include, but not limited to, a DSP (digital signal processor), a CPU (central processing unit), an ASIC (application specific integrated circuit), a programmable logic element, such as an FPGA (field programmable gate array), etc.

While this application has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of searching for a cell in a mobile station, comprising:
receiving a downlink frame including a primary synchronization signal and a secondary synchronization signal, wherein the secondary synchronization signal contains cell identity group information and the primary synchronization signal contains cell identity information within a cell identity group; and searching for a cell using the cell identity group information in the secondary synchronization signal and the cell identity information in the primary synchronization signal, wherein the secondary synchronization signal comprises a first short sequence and a second short sequence, the first short sequence is scrambled with a first scrambling sequence, and the second short sequence is scrambled with a second scrambling sequence and a third scrambling sequence, wherein the first scrambling sequence and the second scrambling sequence are determined based on the cell identity information contained in the primary synchronization signal, and the third scrambling sequence is determined based on the first short sequence.

2. The method of claim 1, wherein the first short sequence scrambled with the first scrambling sequence and the second short sequence scrambled with the second scrambling sequence and the third scrambling sequence are alternately disposed on a plurality of sub-carriers.

3. The method of claim 1, wherein the first scrambling sequence is different from the second scrambling sequence.

4. The method of claim 1, wherein the downlink frame includes a plurality of slots, each slot having a plurality of symbols,
wherein the primary synchronization signal is located on a last symbol of a slot, and the secondary synchronization signal is located on a symbol right ahead of the last symbol of the slot.

5. The method of claim 1, wherein the downlink frame comprises a second secondary synchronization signal containing the cell identity group information,
wherein the second secondary synchronization signal comprises the first short sequence and the second short sequence, the second short sequence is scrambled with the first scrambling sequence, and the first short sequence is scrambled with the second scrambling sequence and a fourth scrambling sequence, and
wherein the fourth scrambling sequence is determined based on the second short sequence.

6. The method of claim 5, wherein the second short sequence scrambled with the first scrambling sequence and the first short sequence scrambled with the second scrambling sequence and the fourth scrambling sequence are alternately disposed on a plurality of sub-carriers.

7. The method of claim 5, further comprising:
identifying the cell identity group using at least one of the first secondary synchronization signal and the second secondary synchronization signal.

8. The method of claim 5, wherein the second secondary synchronization signal is different from the first secondary synchronization signal.

9. A method of searching for a cell by a mobile station in a wireless communication system, wherein the wireless communication system uses a plurality of short sequences grouped into a plurality of short sequence groups, the method comprising:
receiving a downlink frame including a primary synchronization signal and a secondary synchronization signal, wherein the secondary synchronization signal contains cell identity group information and the primary synchronization signal contains cell identity information within a cell identity group; and searching for a cell using the cell identity group information in the secondary synchronization signal and the cell identity information in the primary synchronization signal, wherein the secondary synchronization signal comprises a first short sequence and a second short sequence, the first short sequence is scrambled with a first scrambling sequence, and the second short sequence is scrambled with a second scrambling sequence and a third scrambling sequence, wherein the first scrambling sequence and the second scrambling sequence are determined based on the cell identity information contained in the primary synchronization signal, and the third scrambling sequence is determined based on a short sequence group to which the first short sequence is assigned and is determined based on a remainder of dividing an index of the first short sequence by 8.

10. The method of claim 9, wherein the wireless communication system has 31 short sequences, and the index of the first short sequence has one value among 0 to 30.

11. The method of claim 10, wherein short sequences within the short sequence group have the same remainder.

12. The method of claim 9, wherein the downlink frame comprises a second secondary synchronization signal containing the cell identity group information,
wherein the second secondary synchronization signal comprises the first short sequence and the second short sequence, the second short sequence is scrambled with the first scrambling sequence and the first short sequence scrambled with the second scrambling sequence and a fourth scrambling sequence,
wherein the fourth scrambling sequence is determined based on a short sequence group to which the second short sequence is assigned and is determined based on a remainder of diving an index of the second short sequence by 8.

13. The method of claim 12, wherein the wireless communication system has 31 short sequences, and the index of the second short sequence has one value among 0 to 30.

14. The method of claim 13, wherein short sequences within the short sequence group have the same remainder.

15. A method of searching for a cell by a mobile station in a wireless communication system, the method comprising:
receiving a downlink frame including a primary synchronization signal, a first secondary synchronization signal and a second secondary synchronization signal, wherein each of the first and second secondary synchronization signals contains cell identity group information and the primary synchronization signal contains cell identity information within a cell identity group; and
searching for a cell using the cell identity group information and the cell identity information, the cell identity group information being identified using at least one of the first secondary synchronization signal and the second secondary synchronization signal, and the cell identity information being identified using the primary synchronization signal,
wherein the first secondary synchronization signal comprises a first short sequence and a second short sequence, the first short sequence is scrambled with a first scrambling sequence, and the second short sequence is scrambled with a second scrambling sequence and a third scrambling sequence, and
the second secondary synchronization signal comprises the first short sequence and the second short sequence, the second short sequence is scrambled with the first scrambling sequence, and the first short sequence is scrambled with the second scrambling sequence and a fourth scrambling sequence, and wherein the first scrambling sequence and the second scrambling sequence are determined based on the cell identity information contained in the primary synchronization signal, the third scrambling sequence is determined based on a remainder of dividing an index of the first short sequence by 8, and the fourth scrambling sequence is determined based on a remainder of dividing an index of the second short sequence by 8.

16. The method of claim 15, wherein the first short sequence scrambled with the first scrambling sequence and the second short sequence scrambled with the second scrambling sequence and the third scrambling sequence in the first secondary synchronization signal are alternately disposed on a plurality of sub-carriers, and the second short sequence scrambled with the first scrambling sequence and the first short sequence scrambled with the second scrambling sequence and a fourth scrambling sequence in the second secondary synchronization signal are alternately disposed on a plurality of sub-carriers.

17. The method of claim 15, wherein the first scrambling sequence is different from the second scrambling sequence.

18. The method of claim 15, wherein the downlink frame includes a plurality of slots, each slot having a plurality of symbols, wherein the primary synchronization signal is located on a last symbol of a first slot and the first secondary synchronization signal is located on a symbol right ahead of the last symbol of the first slot, and the primary synchronization signal is located on a last symbol of a second slot and the second secondary synchronization signal is located on a symbol right ahead of the last symbol of the second slot.

19. The method of claim 15, wherein the second secondary synchronization signal is different from the first secondary synchronization signal.

20. The method of claim 15, wherein the wireless communication system has 31 short sequences, and the index of the first short sequence has one value among 0 to 30, and the index of the second short sequence has one value among 0 to 30.

* * * * *